Feb. 7, 1933. C. G. KELLER 1,896,794
VEHICLE WHEEL
Filed April 24, 1928  2 Sheets-Sheet 1

INVENTOR
*Charles G. Keller.*
BY
ATTORNEYS

Feb. 7, 1933.  C. G. KELLER  1,896,794
VEHICLE WHEEL
Filed April 24, 1928  2 Sheets-Sheet 2
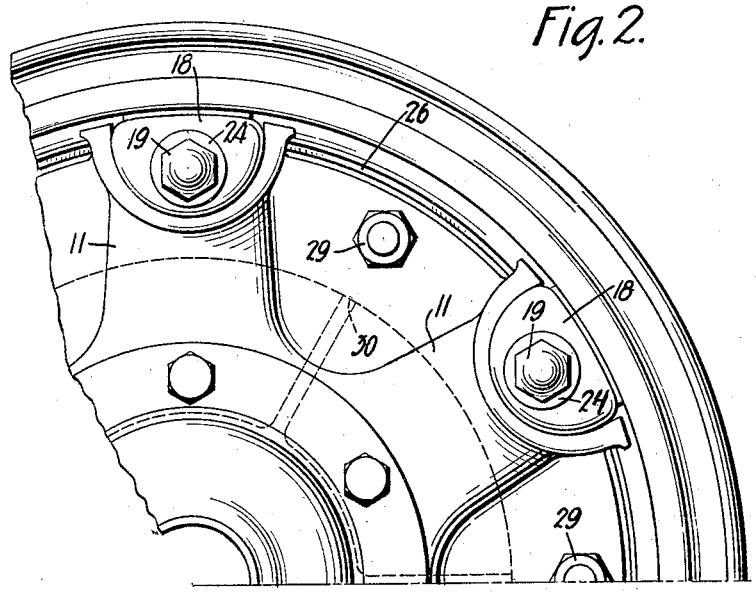
*Fig. 2.*
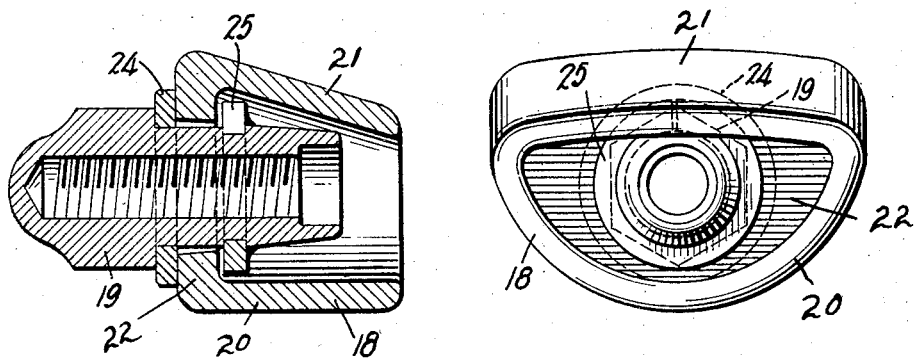
*Fig. 3.*  *Fig. 4.*
INVENTOR
*Charles G. Keller.*
BY
ATTORNEYS Patented Feb. 7, 1933

1,896,794

UNITED STATES PATENT OFFICE

CHARLES G. KELLER, OF POUGHKEEPSIE, NEW YORK

VEHICLE WHEEL

Application filed April 24, 1928. Serial No. 272,404.

This invention relates to vehicle wheels and more particularly to the means employed for detachably securing the removable rims.

The present invention is an improvement on the construction illustrated and claimed in my prior copending application, Serial No. 182,199, filed April 9, 1927. The present invention relates particularly to the rim clamping wedge member, and the main objects of the invention are to simplify and reduce the cost of manufacture as well as the weight of the removable parts, to reduce the liability of stripping the threads of the clamping nuts and bolts, and to facilitate the assembly of the parts, both in the manufacture of the combined rim clamping member and nut and in the application of the nut and the bolt in clamping the rim on the wheel.

As one important feature of the invention the rim clamping wedge is made subtantially hollow with a comparatively thin end wall so as to materially reduce its weight.

As another important feature the nut is provided with a shank which extends through the end wall and to a considerable distance within the wedge so as to provide a long threaded bearing surface on the nut.

As a further important feature the shank is provided with means adjacent to the inner surface of the end wall and intermediate of the ends of the shank for holding the nut and wedge against relative longitudinal movement.

As a further feature the shank is provided with a recess at its inner end to facilitate the guiding of the nut onto the bolt in assembling the parts.

I have illustrated my invention as applied to a wheel in which the tires are secured directly to the spoke ends without the use of any felly, and in which the spokes have air passages lengthwise thereof.

This type of wheel, so far as concerns the air passages and the automatic cooling resulting from the circulation of air through the spokes and between them, is disclosed and claimed in my copending application Serial No. 154,092, filed Dec. 11, 1926.

In the accompanying drawings I have illustrated my present invention as applied to a wheel having twin pneumatic tires, but it will be evident that it is also applicable to wheel constructions in which only a single tire is used, and in which the tires are solid or of constructions other than pneumatic. I have illustrated certain standard forms of rims, but it will be evident that the invention is equally applicable for the securing of other forms of rims upon the proper designing and proportioning of the rim seating surfaces.

In these drawings:

Fig. 2 is an end view.

Fig. 3 is a central longitudinal section of the removable rim clamping member, and Fig. 4 is an end view of the parts shown in Fig. 3.

Figure 1:
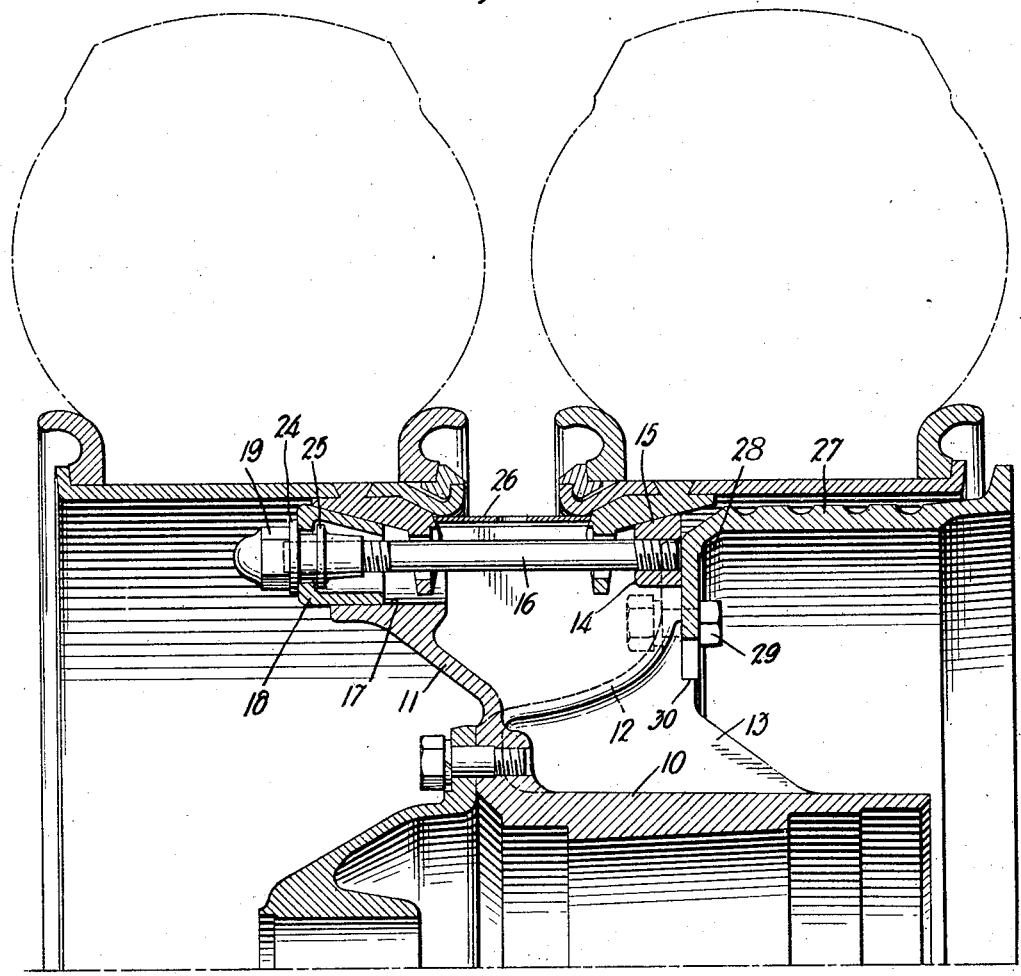
Fig. 1 is a longitudinal radial section through a construction embodying my invention.

I have illustrated my invention as applied to a vehicle wheel having a hub 10 and spokes 11 cast integral therewith, and in which no felly is employed. The spokes are substantially channel-shape in cross-section so as to provide an air passage lengthwise of each spoke, and through which air is caused to circulate by centrifugal or fan action when the wheel is rapidly rotated. The spokes are connected and braced by a web 12 which curves axially and radially from the outboard side of the spoke at its radially inner end to the inboard side of the spoke at its radially outer end. These webs are braced and reinforced by ribs 13 which are also cast integral and are disposed between adjacent spokes.

Each spoke at its radially outer end has a bridge piece 14 serving a double function. It presents an inclined surface 15 facing radially outward and axially, and on which one rim may seat, and it also carries a bolt 16 to which the rim clamping member is detachably secured.

At the outboard side of the spoke opposite to the bridge piece 14, there is a substantially semi-circular axially disposed guideway or channel 17. The clamping bolt extends axially into or through this guideway at a point eccentrically disposed in respect to the axis of said guideway.

The features so far described in detail are somewhat similar to the construction illustrated in my copending applications Serial No. 182,199 and Serial No. 154,092.

As an important feature of the present invention I provide a rim clamping member 18 which is adapted to slide axially in the guideway 17 and along the bolt 16. This member may be of a steel forging or a casting, or may be cut from bar stock. In the form shown in detail in Figs. 3 and 4, it is hollow with a nut 19 secured in the end wall thereof. The member 18 has a substantially semi-cylindrical peripheral wall 20 which is of a curvature corresponding to that of the guideway 17, and it also has a slightly curved and axially inclined wall 21 for direct engagement with a correspondingly inclined and curved surface of a rim clamped on the wheel.

The member 18 has an inwardly turned flange or end wall 22 at the outboard end which encircles the nut 19. The nut has a shank projecting through this end wall, and on the shank are a pair of collars 24 and 25 which engage with opposite sides of the wall or flange 22 to permanently connect the parts. The collar or ring 25 which is within the clamping member 18 preferably fits into a groove in the shank, and may be split and sprung into place or made of two sections welded in place so as to hold the nut and the clamping member against more than limited relative axial movement. The rings should be of such character as to positively force the member 18 axially in one direction or the other upon rotation of the nut. The aperture in the end wall 22 is preferably slightly larger than the shank of the nut which extends therethrough, so that there may be limited relative radial movement of the two parts to insure proper seating of the wedge member both in the guideway 17 and against the rim. The outer end of the nut 14 is closed or in the form of a cap so as to conceal and protect the end of the bolt 16 and prevent dust or water from getting into the threads to obstruct or corrode the latter.

It is not essential that the axially inclined wall 21 be of the full width of the lug as shown in Figs. 3 and 4. The center portion of this wall may be omitted.

My improved rim clamping device is self-centering by reason of the fact that it has slight radial movement in respect to the bolt and also because it can oscillate about the bolt to present the proper contact with the rim. The construction permits of an extra long thread on the nut so that the liability of stripping the threads is reduced to a minimum. The construction also permits of the use of the same type of clamping member with either a "Goodyear" or "Firestone" standard rim of approximately the same seat angle. The member is positively forced axially into or out of position by the rotation of the nut so that no hammering or bending of parts to loosen them is necessary. The outboard end of the bolt is protected by the cap part of the nut so that no mud, road tar, or other foreign matter can collect on the threads, and no water can seep in to rust them.

Where the wheel is used for twin tires, as in the form illustrated, the parts may be so proportioned that the inboard rim may be seated on the surface 15 and the outboard on the inclined wall or seat 21 of the wedge member. The two rims may be held in axially spaced relationship in any suitable manner, as for instance by means of a spacing member or ring 26.

The construction illustrated is such that a brake drum of the maximum size in respect to the rim may be secured in place but out of direct heat transferring relationship to the rim. As shown there is provided a brake drum 27 having its radially outer surface closely adjacent to but spaced from the inner rim, and corrugated to facilitate heat radiation. The brake drum has a flange 28 directed radially inward which engages with and is bolted to the web 12 by means of bolts 29.

The ribs 13 are so designed that they present shoulders 30 serving as seats for the radially inner edge of the flange 28 so as to insure the proper centering of the brake drum. By centering the brake drum at a comparatively few spaced points along the inner edge of the flange 28, expansion and contraction of the brake drum due to temperature variation through a wide range will not cause deflection or warping of any part of the wheel itself, and there is afforded efficient and simple means for centering the same and also for economical molding and machining operations.

Having thus described my invention, what I claim as new and desire to secure by Letters Patent is:

1. In a vehicle wheel a rim securing means including a member having an axially extending approximately semi-cylindrical recess, a bolt extending in an axial direction therethrough, a hollow member having an end wall at the outboard end and a peripheral wall extending in an inboard direction therefrom, said end wall having an aperture through which said bolt extends, and said peripheral wall having a substantially semi-cylindrical portion seated in said recess and an inclined portion serving as a rim seat, a nut on said bolt and having a shank portion projecting through said end wall into the interior of said hollow member and rotatable in said end wall, and means within the interior of said hollow member and intermediate of the ends of said shank for engaging the inner side of said end wall to pull said member out of said recess when said nut is rotated in one direction.

2. In a vehicle wheel, a rim securing means including a wheel body portion having an axially extending guide surface, a bolt extending parallel thereto, a hollow rim clamping member slidable on said surface and having a wall engaging said guide surface, an inclined rim supporting wall, and a comparatively thin end wall, a nut having a shank projecting through said end wall, and means within the interior of said hollow member and intermediate of the ends of said shank for engaging the inner side of said end wall to pull said member out of said recess when said nut is rotated in one direction.

3. A rim clamping member, including a hollow body having an end wall provided with an aperture therethrough, a supporting wall extending from said end wall and substantially at right angles thereto, and a rim supporting wall inclined in respect to said end wall and presenting a rim seat, a nut having a shoulder engaging the outer surface of said end wall and a shank projecting through said end wall into the interior of said member, and means intermediate of the ends of said shank for engaging the inner surface of said end wall to prevent relative longitudinal movement of said nut and said member.

Signed at Newark in the county of Essex and State of New Jersey, this 18th day of April A. D. 1928.

CHARLES G. KELLER.